Nov. 3, 1970     A. C. BURKETT     3,537,729

EXPANSION JOINT FOR PIPE

Filed Dec. 28, 1967

TEMPERATURE EFFECT ON LINEAR EXPANSION AND CONTRACTION

INVENTOR
ALBERT C. BURKETT

*John E. Holder*

ATTORNEY

United States Patent Office 3,537,729
Patented Nov. 3, 1970

1

3,537,729
EXPANSION JOINT FOR PIPE
Albert C. Burkett, Winnie, Tex., assignor to Sun Oil Company, Philadelphia, Pa., a corporation of New Jersey
Filed Dec. 28, 1967, Ser. No. 694,190
Int. Cl. F16l 9/14
U.S. Cl. 285—55    5 Claims

ABSTRACT OF THE DISCLOSURE

The particular embodiment described herein as illustrative of one form of the invention utilizes a plastic connecting member to form a continuous plastic pipeline between spaced apart plastic lined metallic pipes. Slip joints are formed between the pipe liners and the plastic connecting member to form a fluid seal while permitting relative movement between the plastic pipe components.

BACKGROUND OF THE INVENTION

This invention relates to an expansion joint for pipe, and more particularly, a plastic expansion joint for use between plastic lined pipes carrying corrosive materials such as hydrocarbon compounds.

Flow lines, such as metallic pipe lines conveying petroleum products, chemicals, et cetera, often extend over great distances either above the surface of the ground, as for example in chemical plants, or beneath the ground when carrying products over great distances. The chemical activity of the fluid flowing through the pipeline usually creates a corrosive condition which will cause serious damage to the inner surface of the metallic pipe. The corrosive activity is generally an electro-chemical process which is not totally dependent upon highly corrosive chemical product, but to the contrary, may cause serious damage with water as the corrosive agent. Furthermore, paraffins present in liquid petroleum products tend to congeal as the liquid cools and permits the paraffin to accumulate on the inner walls of the pipeline to restrict flow in the line. In addition, scale deposition frequently occurs, thus also restricting the flow capacity of the line. It is a difficult and costly task to remove damaged or restricted pipe sections for repair or replacement, particularly those installed underground or in other such inaccessible places. Therefore in the past it has been a common practice to paint or otherwise coat the interior of a pipeline with a suitable non-corrosive substance, either prior to the installation of the pipe, or even after the pipeline has been in service. Some of the disadvantages of such an operation include problems of applying a continuous coating, and the lack of smoothness of the applied coating. It is readily seen that such quality control problems would be even more probable where such coating operations are performed on pipeline in place.

The above disadvantages are overcome to a great extent by the use of a plastic liner which is comparatively simple to install within pipe, and which may be inserted within the pipe at the location of usage. A plastic liner resists the corrosive action of fluid flowing therethrough and thus protects the interior surface of the metallic pipe from such corrosion. The physical properties of plastic liner are such that it presents a smooth surface and one to which paraffin and scale will not adhere to any great extent. Thus, the plastic liner not only prevents corrosive damage to the interior of the pipeline, but also substantially precludes any restriction to laminar fluid flow.

Several techniques have been devised for joining sections of such plastic pipe to insure the integrity of the plastic liner throughout the length of the pipe. One such technique is disclosed in U.S. Pat. No. 2,982,311 issued to N. R. Haskell. Plastic pipe liners have a greater thermal coefficient of linear expansion than the metallic pipe in which they are installed, and therefore provisions must be made for the expansion of the plastic liners. The Haskell patent also shows this provision. However, such prior art devices have not provided a satisfactory technique for lining curves or elbow sections of a pipe, wherein the apparatus also provides for the linear expansion of the plastic material. In addition, such prior art devices are not as readily adaptable for installation in existing pipe systems, nor as simple and integral in construction as is desirable. They are also restrictive in the amount and direction of linear expansion of the liner which is permitted. Heretofore, plastic fittings such as elbows and tees have been welded or otherwise positively joined to the pipe liners in order to negotiate changes in the pipe direction. Alternatively, the metal casing normally used for such turns in a pipeline have been left unprotected. In the electrochemical corrosion process, which causes the deterioration of pipes, a portion of the pipe itself forms an anode that goes into solution in the corrosive medium acting as an electrolyte. Therefore, if only a small portion of the pipe is left unprotected, such a section will act as the anode and thereby deteriorate much more rapidly because of the lesser surface area forming the anode. It is therefore important that the integrity of the plastic liner be maintained throughout the pipe section, including the curves or bends in the pipe, to not only insulate potential anodic surfaces, but also to isolate the metal surface from the fluid electrolyte flowing through the line so that chemical corrosive damage does not continue to occur to such metal casing.

It is therefore an object of the present invention to provide a new and improved expansion joint for a section of a pipe system utilizing plastic liners in a metallic casing.

SUMMARY OF THE INVENTION

With these and other objects in view, the present invention contemplates a connecting member and expansion joint for joining plastic liners in piping system. The connecting member replaces a section of the pipe and has end members which are axially alignable with plastic liners extending from spaced sections of pipe casing. The liners and connecting members are sized so that the extending portions of the liner may be telescopically received within the interior bore portion of the ends of the connecting member and thereby provide overlapping portions between the liners and ends of the connecting member. Annular sealing members are positioned between the overlapping portions at each end of the connecting member to provide a fluid seal therebetween. Flanged end sections are connected to respective ends of the connecting section after positioning of a coupling about the flanged ends. The couplings are then attached to mating couplings on the metallic casing of the pipe system to provide a means for assembling the apparatus to the pipe sections.

Other objects and advantages of the invention will be evident from the following detailed description, when read in conjunction with the accompanying drawings.

DESCRIPTION OF THE PREFERRED EMBODIMENT

Figure 1:
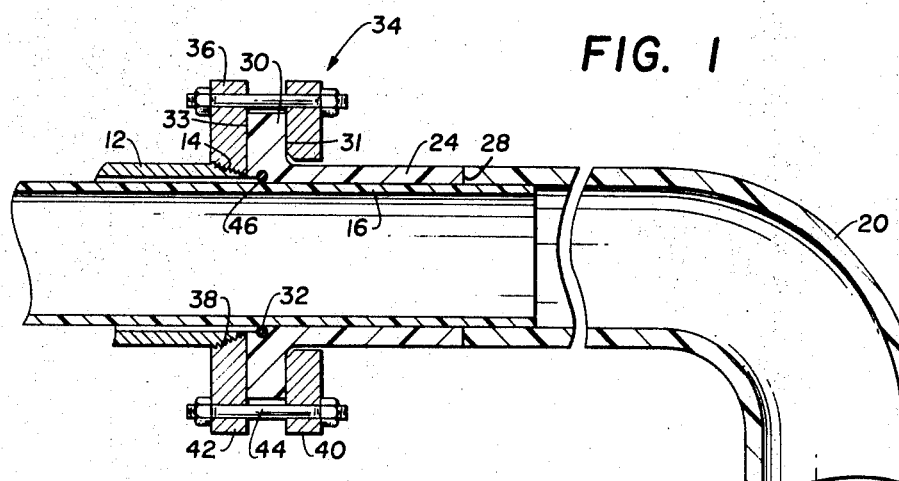
FIG. 1 is a cross sectional view of an expansion joint for pipe embodying the principles of the present invention.

Referring first to FIG. 1 of the drawings, one end of a typical section of steel pipeline 12 is shown having an externally threaded portion 14. A plastic pipe liner 16 is shown positioned within the metallic pipe 12 with an end portion of the liner extended outwardly from the end of the pipe. The pipe 12 may be positioned in the ground with the end portion thereof and extending liner exposed to the surface. However, for purposes of illustration it can be assumed that portions of the pipeline and apparatus forming part of the present invention are positioned above the surface of the ground. Such an installation might be found, for example, in a chemical plant or on an oil lease where above ground piping is used to carry chemical or petroleum products. A second section of metal pipe 18 is shown spaced from the end of the first pipe and lying on an axis which is perpendicular to that of the first pipe. A plastic pipe liner 22 is positioned in the pipe 18 and has an end portion extending outwardly from the end of pipe. The spaced pipe section 18 shown in FIG. 1 represents a continuous piping system which has passed around a curve, but with the normal elbow pipe section removed to accommodate the apparatus which forms a part of this invention. Although pipe elbows and other such steel pipe fittings may be interiorly coated with a plastic material for such purposes, there are certain disadvantages in the use thereof including the costs of fabricating the elbows, and maintaining the nonmetallic integrity of the pipe system.

The apparatus for connecting the ends of the lined pipe is comprised of a tubular center section 20 which has been bent in the shape of an elbow as shown in FIG. 1, with the end portions being arranged for alignment with the ends of the spaced pipes. It is pointed out that the 90 degree elbow section 20 shown in FIG. 1 is for purposes of illustration only, and that a variety of shaped members could be used for joining the spaced sections of the pipe. The elbow is made of a chemically inert material such as plastic, having a smooth interior bore. The wall thickness of the elbow section is determinable by design factors pertaining to the particular installation and service for which the apparatus is being used. The liners 16, 22 extending from respective ends of the pipes may be made of the same or similar inert material, with the material for the liners and connecting member being preferably chosen from any number of thermoplastic and thermosetting materials. Among those materials now available from various pipe suppliers in both pipe and pipe fittings are polyvinyl chloride, (PVC), acronitrile butadiene styrene (ABS), saran, polypropylene, TFE, Teflon, FEP, chlorinated polyether, and vinylidene fluoride. The particular material to be used will depend upon the system design criteria such as pressure, temperature, corrosion resistance to various materials, cost, et cetera. For example, polypropylene pipe has excellent resistance to a variety of chemicals and can be used economically for many types of service where temperatures do not exceed approximately 250 degrees F. Vinylidene fluoride pipe has an upper operating limit of approximately 300 degrees F. On the other hand, a variety of fluoroplastic liners including TFE-lined piping have made it possible to obtain the chemical and corrosion resistance of a plastic in installations involving temperatures as high as 500 degrees F. Where the extra costs of TFE linings cannot be economically justified, other types of lined piping systems based on polypropylene and vinylidene fluoride as well as piping lined with Teflon FEP (fluorinated ethylene propylene) may be preferable. The latter material has about the same degree of chemical inertness as TFE with an upper temperature limit of around 400 degrees F.

Depending upon pipe size, plastic liners such as polypropylene liners now being offered on the market range in wall thickness from ⅛ inch to ½ inch and are operated at pressures ranging between a vacuum to 300 plus p.s.i. It should be noted here that when such pipe is threaded, design criterial calls for a rating of the liner at 50 percent of its normal working pressure.

In addition to the elbow member, the arrangement for coupling or connecting the sections of lined pipe includes fittings 24, 26 which are welded as at 28 to respective ends of the plastic elbow section 20. The fittings 24, 26 are comprised of a tubular portion of plastic pipe having a shoulder 30 at one end thereof. The shoulder 30 forms vertical surfaces 31 and 33 on the inner and outer sides of the shoulder. Opposite the shoulder, an annular recess 32 is formed within the interior bore of the fitting. A coupling generally denoted by the reference numeral 34 is provided for attaching the connecting apparatus to respective end sections 12 and 18 of the pipeline. The coupling includes a first annular flange member 36 having a threaded bore portion 38 for engagement with the external threads 14 on the ends of the metallic pipe sections. A second annular flange member 40 also has a bore portion which is sized for reception about the flanged fittings 24, 26. Each of the annular flanged member 36, 40 has transverse openings 42 for reception of bolts 44 to provide a rigid connection between the flanged members. An O-ring or other such annular seal member 46 is shown in position within the recess 32 in the interior bore of the fittings 24, 26 for providing a fluid tight sliding seal between the interior bore of the fittings and the exterior surface of a plastic liner extending from the pipe sections. It is noted that each end of the connecting center section 20 has an arrangement of parts, such as the shouldered fitting and coupling members described above.

In the use of the apparatus described above, in conjunction with a pipeline operation, it will be assumed that a plastic pipe liner has been positioned within the metal casing of a pipeline, whether it be in a new installation or in an effort to remedy corrosion problems within a previously used pipeline. A portion of the liner should be left extending from the ends of the pipe sections to be joined with the end of the pipes being threaded about their outer surface. For purposes of describing the assembly of the apparatus, one end section of pipe will be treated first, it being understood that the same operation is performed to the other end section in order to complete the assembly. First the annular flange member 36 is attached to the threaded portion 14 of the pipe 12. Next the O-ring 46 or similar annular seal member is positioned within the recess 32 in the interior bore of a flanged fitting 24. The fitting 24 is then fitted over the extending end of the liner 16 with the seal 46 in sliding contact with the outer surface of the liner 16. The fitting 24 is then moved onto the liner until the outer vertical surface 33 of the shoulder 30 is in abutment with the oppositely positioned vertical surface of the first flange member 36. The second flange member 40 is then positioned with its interior bore portion about the tubular portion of the fitting 24 and moved over the fitting until its outer vertical surface is in contact with the inner vertical surface 31 of the shoulder 30 on the fitting 24. Bolts 44 are then positioned through the openings 42 within the flanged members and fitted with nuts which are tightened until the shoulder 30 of the fitting 24 is in snug engagement with the first flange member 36. Next, one end of the tubular plastic center section or elbow member 20 is positioned in engagement with the inner end of the fitting 24 by means of a pipe alignment fixture (not shown) which insures an axial alignment between the tubular members. The opposing plastic pipe ends are then faced and heated by means of an electrical or gas heated hot plate which is inserted between the ends to be joined, or it is clamped and held until a bead is formed on each end of the tubular members. The hot plate is then removed and the hot pipe ends are pressed firmly together and allowed to cool. The above, of course, is but one means of welding or attaching plastic pipe members. When the above operations have been completed, a similar operation is conducted between the elbow member 20 and the end of the other pipe section 18 to connect the other end of the elbow to the pipe section and complete the assembly. It is readily appreciated that obvious deviations from this procedure may be preferred with the resulting assembly being the same. For example, the fitting 26 may be welded to elbow member 20 before the coupling of flanges 36 and 40.

Figure 2:
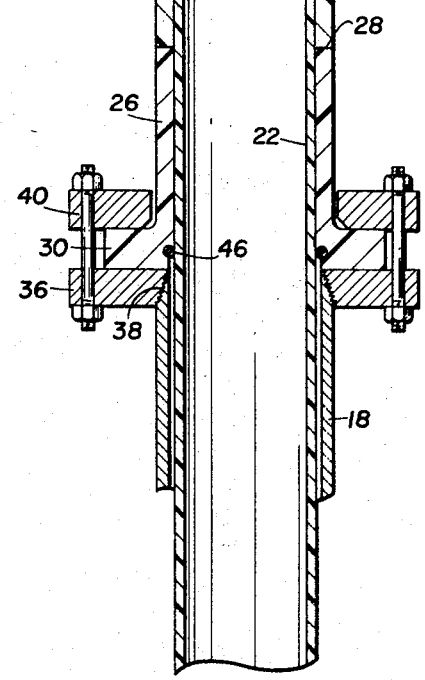
FIG. 2 is a graph showing the temperature effect on linear expansion and contraction of a typical plastic pipe liner.
Figure 2:
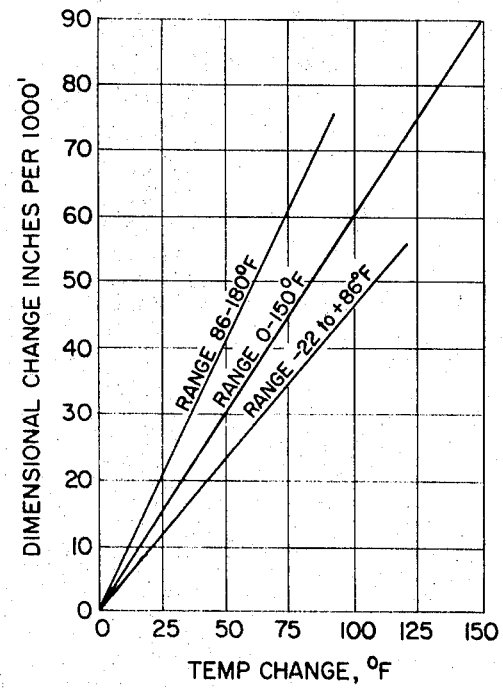

The resulting assembly provides a continuous smooth plastic interior surface which is sealed at its joints to prevent contact between product flowing through the pipeline and metal surfaces in the pipe system. At the same time, the assembly provides an expansion joint which permits longitudinal movement of the tubular liner within the straight end portions of the elbow to thereby prevent stresses within the plastic pipe and any resulting bending or breakage of the pipe. The extent to which such plastic pipe liners are effected in linear expansion by temperature changes is shown by reference to the graph in FIG. 2. FIG. 2 plots linear expansion versus temperature for polypropylene pipe which has been successfully used as a liner for pipe systems. This material has a linear coefficient of expansion of $5 \times 10^{-5}$ in./in./degrees F. The graph in FIG. 2 shows what effects such a rate of expansion has on a pipe one thousand feet long. For example, if the temperature change within the pipe is 100 degrees F., in the range of 0 to 150 degrees F., a pipe 1,000 feet long will expand or contract 60 inches depending upon whether there is a temperature increase or decrease respectively. While polypropylene is typical of the plastics used for the manufacture of pipe liner in its rate thermal expansion and contraction, other plastics which are finding wide spread use in such applications have even greater rates of thermal expansion, as for example, the fluorocarbon plastics, including TFE and Teflon FEP. Because of the relatively high degree of thermal expansion and contraction which is characteristic of such plastic materials, the problem of expansion and contraction of plastic liners in pipe installations is acute. It can be readily seen that where an elbow or other such curved structure exists at the intersection of the piping, the joining of both ends of the elbow directly to liners within the pipe would cause severe distortion at the intersection upon expansion of the liners which, of course, may lead to failure of joints at such an intersection. The apparatus described above affords a means for permitting expansion of the liner from each end of the intersecting pipes while the connecting elbow or curved portion of the pipe is attached to the individual pipe sections, but is not subject to stresses caused by expansion of liners in the pipe section. At the same time, the integrity of the plastic pipe is maintained throughout the system so that no metal portions of pipe are exposed to product within the pipeline.

While a particular embodiment of the present invention has been shown and described, it is apparent that changes and modifications may be made without departing from this invention in its broader aspects and therefore, the aim is to cover all such changes and modifications as fall within the true spirit and scope of this invention.

What is claimed is:

1. An apparatus for connecting two separated lengths of lined pipe, comprising: first and second tubular members within said pipe and spaced from one another, with said first and second tubular members having a relatively large thermal coefficient of linear expansion; a tubular connecting member having end portions axially alignable with and positioned over the respective ends of said first and second tubular members, said end portions and respective ends overlapping one another, said tubular members being constructed of a non-corrosive, non-conductive material; seal means positioned between each of said end portions and respective ends of said first and second tubular members, said seal means being arranged to provide for relative movement between said overlapping members while maintaining said fluid seal between the overlapping tubular members and the connecting member; and means for attaching the connecting member to the pipe sections, including annular shoulders on the ends of said connecting member and means for engaging said shoulders, said engagement means being attached to the pipe sections.

2. The apparatus of claim 1 wherein said tubular members are plastic liners positioned within metal pipe sections and arranged to expand and contract longitudinally within said metal pipe.

3. An apparatus for providing a lining within a pipe having sections spaced from one another along dissimilar axes, comprising: tubular liners positioned within each of the pipe sections, said liners being made from material having a thermal coefficient of expansion considerably greater than that of the material of the pipe sections; a tubular connecting member having end portions axially alignable with respective ends of said pipe sections, said liners and connecting members being constructed of a substantially non-corrosive, non-conductive material which in a sealed configuration provides a continuous piping surface of such a material, said end portions and respective ends of said liner overlapping one another, having seal means positioned therebetween for providing a fluid seal, said seal means being arranged to provided for relative movement between the overlapping liners and connecting member while maintaining said fluid seal; and means for coupling the tubular connecting member to the pipe sections, including annular shoulders at each end of the connecting member.

4. An apparatus for coupling metal pipe sections wherein the pipe sections have plastic liners positioned within the interior bore of the pipe sections and the pipe sections are spaced from one another, comprising: a plastic connecting section having end portions alignable with the ends of said plastic liners, said plastic liner ends extending beyond the ends of said pipe sections and slidably received within the aligned ends of said connection section to provide overlapping portions between said liner ends and connection section; annular seal means positioned between said overlapping portions to form a fluid seal therebetween, said seal means being arranged between said overlapping portions to permit relative sliding movement therebetween; annular shoulder portions formed on the exterior surface of the ends of said connecting section; flange means connected to said pipe section ends and positioned for engaging said shoulder portions; means to join said shoulder portions and said flange means so as to provide a coupling between said pipe sections and said connecting section.

5. The apparatus of claim 4 wherein said end portions of the connecting section each include a section arranged to be joined to the remainder of said connecting section after said flange means is engaged with said shoulder portions.

References Cited

UNITED STATES PATENTS

| | | | |
|---|---|---|---|
| 3,131,642 | 5/1964 | Geer et al. | 285—55 X |
| 3,236,543 | 2/1966 | Mueller | 285—55 X |
| 3,244,438 | 4/1966 | Bucheit | 285—55 X |
| 3,268,240 | 8/1966 | Gerner | 285—55 |
| 3,351,361 | 11/1967 | Martin | 285—187 X |
| 912,671 | 2/1909 | Griesser | 285—133 X |
| 3,265,414 | 8/1966 | Reid et al. | 285—423 X |

FOREIGN PATENTS

| | | |
|---|---|---|
| 908,479 | 9/1945 | France. |

DAVE W. AROLA, Primary Examiner

U.S. Cl. X.R.

285—368, 423